(12) United States Patent
Shemtov

(10) Patent No.: US 9,920,867 B1
(45) Date of Patent: Mar. 20, 2018

(54) COMPRESSION COUPLING ASSEMBLY FOR SECURING CONDUITS TOGETHER

(71) Applicant: Atkore Steel Components, Inc., Coconut Creek, FL (US)

(72) Inventor: Sami Shemtov, Hollywood, FL (US)

(73) Assignee: Atkore Steel Components, Inc., Coconut Creek, FL (US)

( * ) Notice: Subject to any disclaimer, the term of this patent is extended or adjusted under 35 U.S.C. 154(b) by 595 days.

(21) Appl. No.: 14/556,534

(22) Filed: Dec. 1, 2014

Related U.S. Application Data

(63) Continuation-in-part of application No. 14/508,028, filed on Oct. 7, 2014, now abandoned.

(51) Int. Cl.
  *F16L 19/08* (2006.01)
  *F16L 37/12* (2006.01)

(52) U.S. Cl.
  CPC ......... *F16L 19/083* (2013.01); *F16L 37/1215* (2013.01); *Y10T 29/49881* (2015.01)

(58) Field of Classification Search
  CPC ....... F16L 19/055; F16L 19/005; F16L 19/05; F16L 19/06; F16L 19/083; F16L 37/088; F16L 37/1215; F16L 15/08; Y10T 29/49881
  USPC ......... 285/393, 81, 340, 249, 353, 356, 342, 285/343
  See application file for complete search history.

(56) References Cited

U.S. PATENT DOCUMENTS

| 4,088,348 A | 5/1978 | Shemtov |
| 4,159,134 A | 6/1979 | Shemtov |
| 4,159,859 A | 7/1979 | Shemtov |
| 4,163,573 A * | 8/1979 | Yano .......................... 285/340 X |
| 4,606,562 A | 8/1986 | Saraceno |
| D287,396 S | 12/1986 | Shemtov |
| 4,641,863 A | 2/1987 | Shemtov |
| D376,415 S | 12/1996 | Shemtov |
| 5,833,276 A * | 11/1998 | Thompson, Jr. ...... F16L 19/083 |
| 5,871,239 A | 2/1999 | Boscaljon et al. |
| 6,476,319 B1 | 11/2002 | Shemtov |
| 6,808,181 B1 | 10/2004 | Shemtov |
| 6,835,088 B2 | 12/2004 | Shemtov |
| 6,939,160 B2 | 9/2005 | Shemtov |
| 7,126,064 B1 | 10/2006 | Shemtov |
| 7,476,817 B1 | 1/2009 | Shemtov |

(Continued)

*Primary Examiner* — Gregory J Binda
*Assistant Examiner* — Zachary T Dragicevich

(57) ABSTRACT

A coupling assembly for securing rigid conduits together end-to-end, or to a junction box, includes a coupling body, one or two compressible gland rings, and one or two compression nuts. The coupling body includes a first segment extending from a second segment, with an optional midsection therebetween. The compression nut threadably engages about externally-threaded coupling first and/or second segments, compressing a gland ring as it is tightened. A bend in the compression nut, and complementarily chamfers formed in the coupling body and the gland ring, may help to squeeze and compress the gland ring. The compressible gland ring is internally-threaded, and, when compressed, it bites down or grips unthreaded conduits, and its threads interlock with threads of threaded conduits. Two conduits may be secured together by rotating the coupling body and/or the compression nut of the coupling assembly without needing to rotate conduits, which can be heavy and cumbersome.

18 Claims, 17 Drawing Sheets

(56) References Cited

U.S. PATENT DOCUMENTS

| | | |
|---|---|---|
| 7,635,816 B1 | 12/2009 | Shemtov |
| 8,129,631 B1 | 3/2012 | Shemtov |
| 8,129,633 B1 | 3/2012 | Shemtov |
| 8,586,877 B1 | 11/2013 | Shemtov |
| 8,586,881 B1 | 11/2013 | Shemtov |
| 8,646,813 B1 | 2/2014 | Shemtov |
| 2005/0194785 A1 | 9/2005 | Shemtov |
| 2005/0212288 A1* | 9/2005 | Stewart ................... 285/249 |

* cited by examiner

| Trade Size Designator | | Approx. Wt* Per 100 Ft. (30.5M) | | Nominal Outside Diameter** | | Nominal Wall Thickness | | Quantity In Master Bundle | |
|---|---|---|---|---|---|---|---|---|---|
| U.S. | Metric | lb. | kg | in. | mm | in. | mm | ft. | m |
| 1/2 | 16 | 82 | 37.2 | 0.840 | 21.3 | 0.104 | 2.60 | 2500 | 762.5 |
| 3/4 | 21 | 109 | 49.4 | 1.050 | 26.7 | 0.107 | 2.70 | 2000 | 610.0 |
| 1 | 27 | 161 | 73.0 | 1.315 | 33.4 | 0.126 | 3.20 | 1250 | 381.3 |
| 1-1/4 | 35 | 218 | 98.9 | 1.660 | 42.2 | 0.133 | 3.40 | 900 | 274.5 |
| 1-1/2 | 41 | 263 | 119.3 | 1.900 | 48.3 | 0.138 | 3.50 | 800 | 244.0 |
| 2 | 53 | 350 | 158.7 | 2.375 | 60.3 | 0.146 | 3.70 | 600 | 183.0 |
| 2-1/2 | 63 | 559 | 253.5 | 2.875 | 73.0 | 0.193 | 4.90 | 370 | 112.9 |
| 3 | 78 | 727 | 329.7 | 3.500 | 88.9 | 0.205 | 5.20 | 300 | 91.5 |
| 3-1/2 | 91 | 880 | 399.1 | 4.000 | 101.6 | 0.215 | 5.50 | 250 | 76.3 |
| 4 | 103 | 1030 | 467.1 | 4.500 | 114.3 | 0.225 | 5.70 | 200 | 61.0 |
| 5 | 129 | 1400 | 634.9 | 5.563 | 141.3 | 0.245 | 6.20 | 150 | 45.8 |
| 6 | 155 | 1840 | 834.5 | 6.625 | 168.3 | 0.266 | 6.80 | 100 | 30.5 |

* For more information only; not a spec requirement.
NOTE: Length= 10 ft. (3.05m) with a tolerance of +/- 0.25 in. (6.35mm).
** NEMA Standard

FIGURE 2

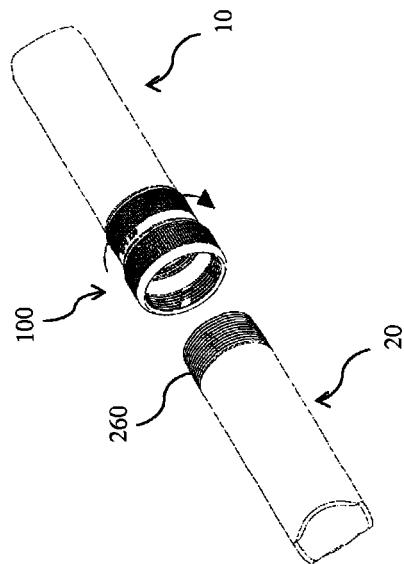
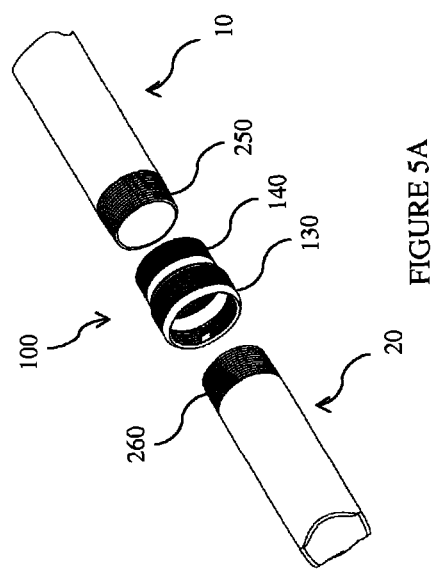
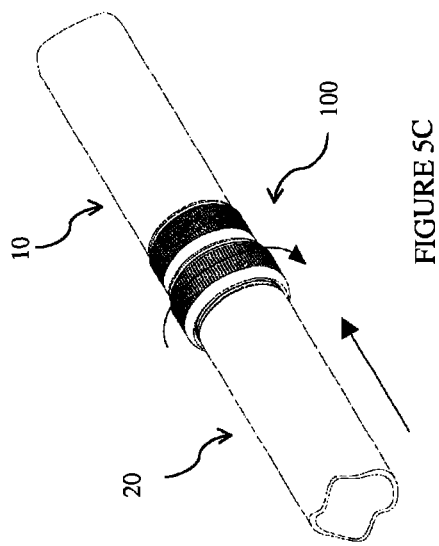

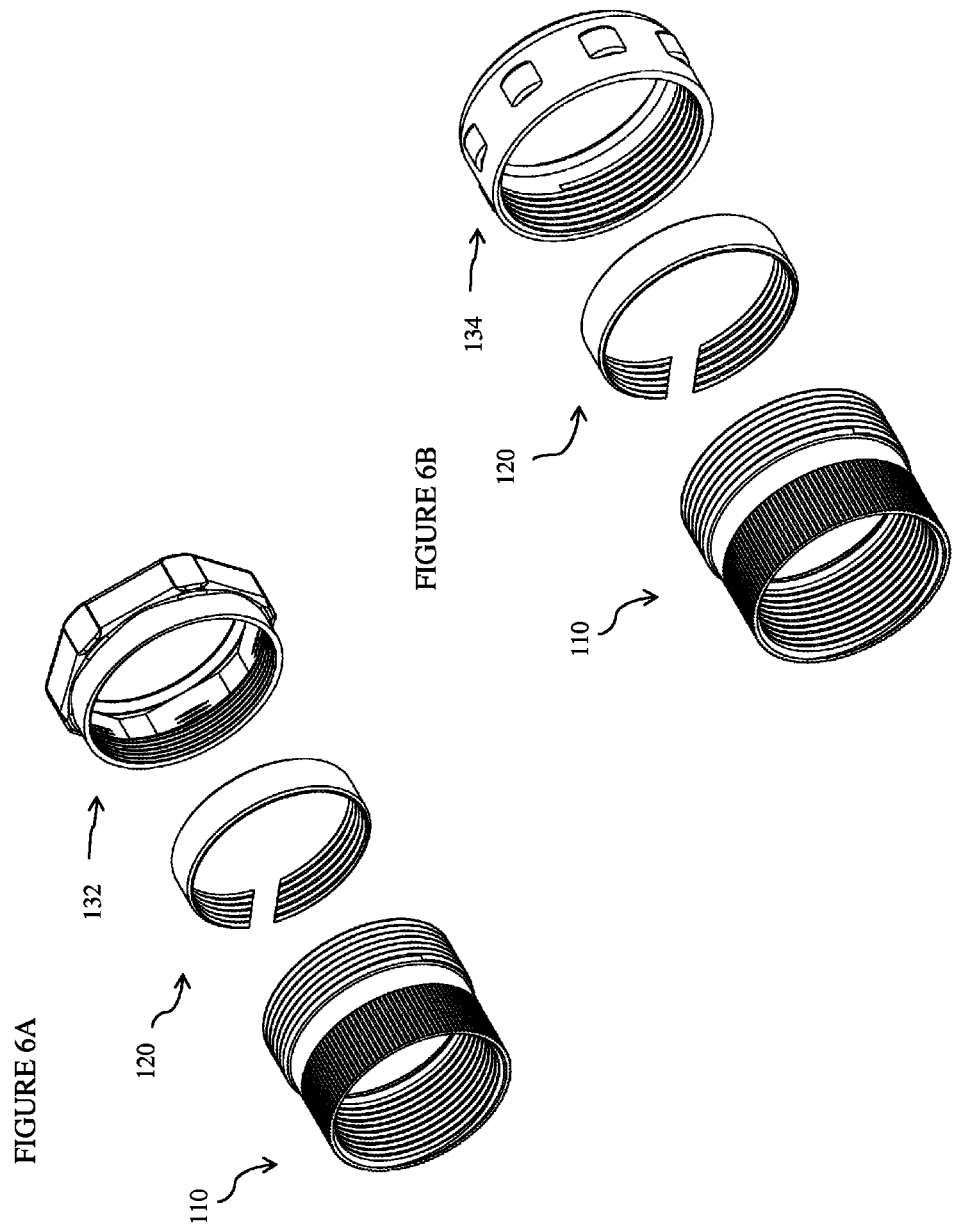

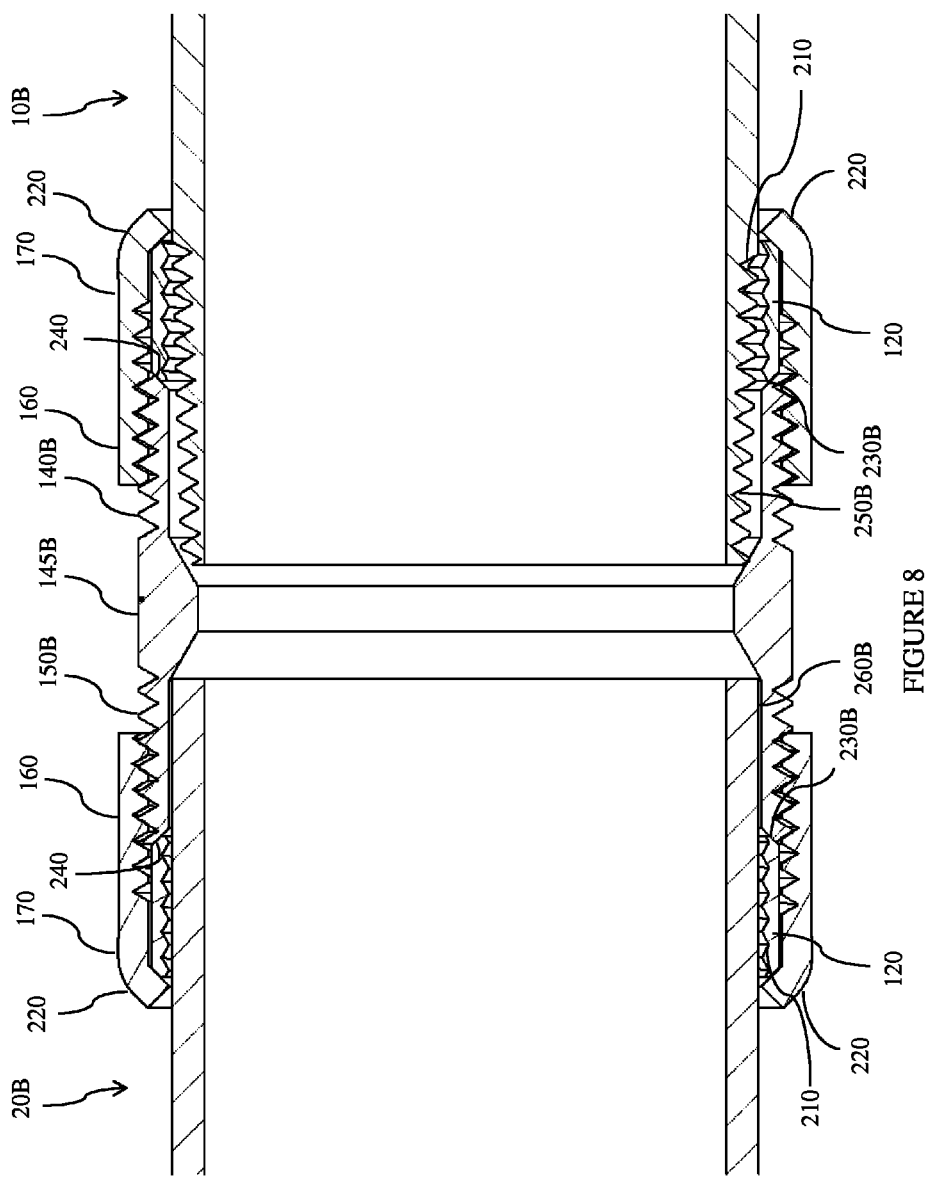

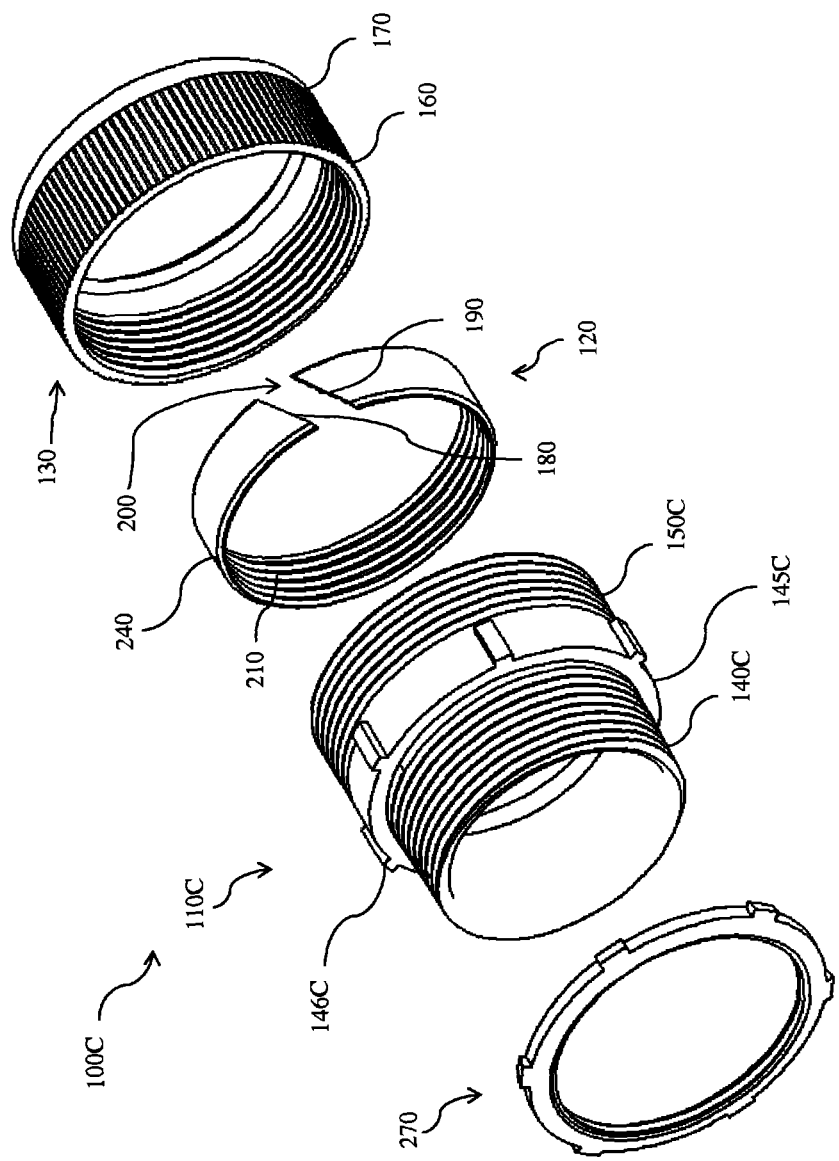

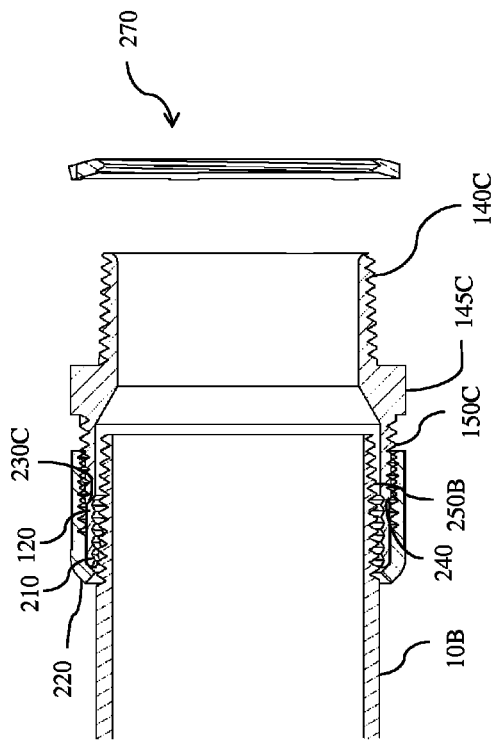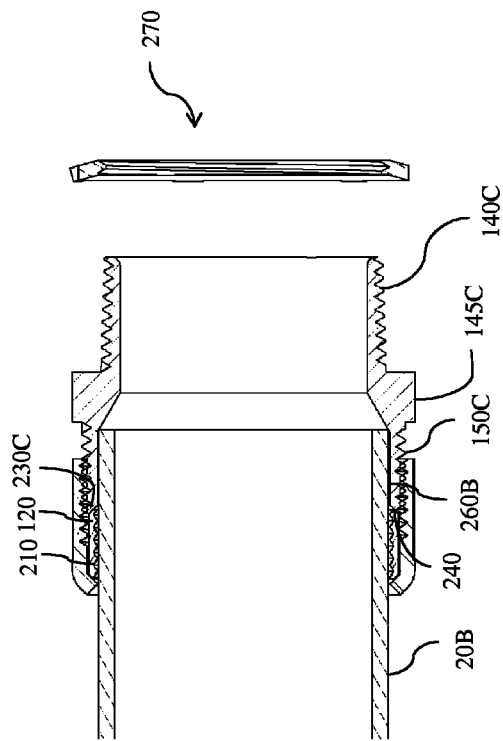
FIGURE 11A
FIGURE 11B

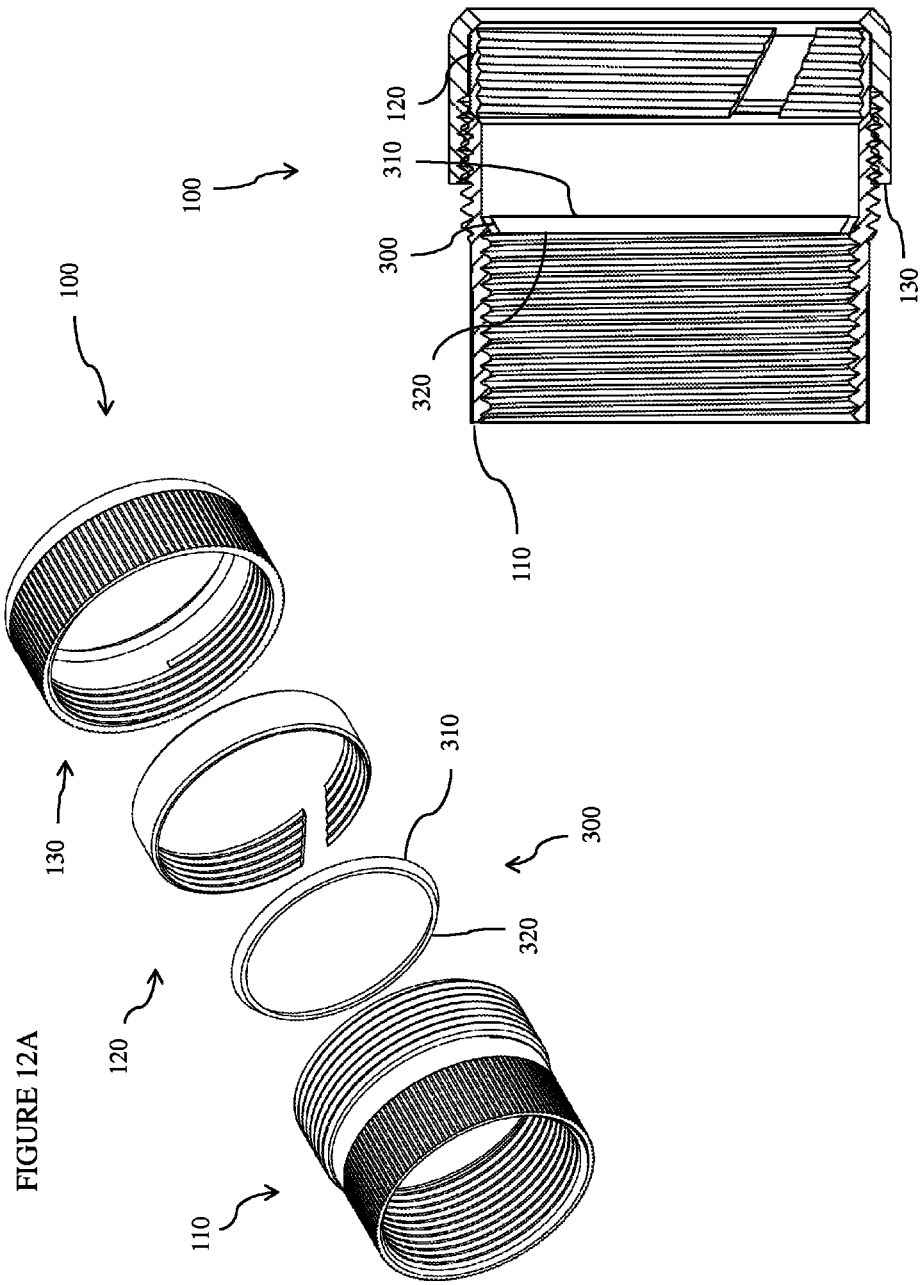

US 9,920,867 B1

COMPRESSION COUPLING ASSEMBLY FOR SECURING CONDUITS TOGETHER

CROSS-REFERENCE TO RELATED APPLICATIONS

This application is a continuation-in-part of U.S. patent application Ser. No. 14/508,028 filed Oct. 7, 2014, now abandoned, which is incorporated by reference herein.

FIELD OF THE INVENTION

This document concerns an invention relating generally to coupling assemblies for securing conduits, and more specifically to compression coupling assemblies for splicing two rigid conduits end-to-end.

BACKGROUND OF THE INVENTION

A conduit system may include a set of tubes, pipes, or other conduits for electrical and mechanical wires, connectors, and other components. Conduit bodies may be used to house electrical or mechanical components at junctions of two or more sections, or at terminal points, of a conduit system. Sample conduit bodies are discussed in U.S. Pat. No. 8,129,631 to Shemtov.

Securing two rigid conduits to each other end-to-end traditionally involves using the threaded coupling 1 shown in FIG. 1A. As shown in FIG. 1B, one end of the coupling 1 is first screwed onto a first conduit 10. To secure a second conduit 20 to the coupling 1, the second conduit 20 must be rotated in order to screw it into the coupling 1, as shown in FIG. 1C. These conduits are bulky and heavy. For example, referring to the table in FIG. 2, each ten-feet length of commonly-used conduits can weigh 55.9 pounds (for U.S. trade size 2½), 72.7 pounds (for U.S. trade size 3), 88 pounds (for U.S. trade size 3½), or 103 pounds (for U.S. trade size 4). The task represented in FIGS. 1A, 1B, and 1C, therefore, normally requires multiple persons working together to maneuver the conduits and rotate them into the coupling. What is needed is a coupling assembly and method of securing conduits to each other that is more convenient to use by fewer users or by one user.

SUMMARY OF THE INVENTION

The invention, which is defined by the claims set forth at the end of this document, is directed to a coupling assembly and a method of securing conduits together which at least partially alleviate the aforementioned problems. A basic understanding of some of the features of preferred versions of the invention can be attained from a review of the following brief summary of the invention, with more details being provided elsewhere in this document. To assist in the reader's understanding, the following review makes reference to the accompanying drawings (which are briefly reviewed in the "Brief Description of the Drawings" section following this Summary section of this document).

Referring initially to FIGS. 3A, 3B, and 4, an exemplary coupling assembly 100 includes a coupling body 110, a gland ring 120, and a compression nut 130 for securing two rigid conduits 10, 20 together end-to-end. The coupling body 110 includes a coupling first segment 140 extending from a coupling second segment 150, and the compression nut 130 includes a nut first segment 160 extending from a nut second segment 170. The nut first segment 160 is sized such that it can fit about the coupling second segment 150.

Referring also to FIGS. 5A, 5B, and 5C, to secure a first conduit 10 to a second conduit 20, the coupling first segment 140 can be engaged about the first conduit 10 by rotating the coupling first segment 140 about the first conduit 10. The second conduit 20 can be inserted into the compression nut 130 of the coupling assembly 100, and the compression nut 130 rotated about the second conduit 20 to compress the gland ring 120 about the second conduit 20 and secure the second conduit 20 to the coupling assembly 100. The two conduits 10, 20 can be secured together by rotating the coupling body 110 and the compression nut 130 rather than the conduits 10, 20 (which can be very cumbersome). As further discussed below, gland ring 120 is preferably internally threaded with threads that match the pitch of the external threading of conduits that are to be secured. The internal threads of the gland ring 120 allow the assembly 100 to secure conduits that are unthreaded externally by having the internal threading of gland ring 120 clamp down on, bite into, or grip a conduit that has a smooth outer surface. The gland ring 120 also allows assembly 100 to better secure conduits that are externally threaded by having the internal threading of gland ring 120 interlock with the external threading of conduits; this interlocking enhances the clamping/biting/gripping of externally threaded conduits.

Referring to FIGS. 7 and 8, an alternative exemplary assembly 100B includes coupling body 110B for securing two rigid conduits 10B, 20B together end-to-end. The coupling body 110B includes a coupling first segment 140B and a coupling second segment 150B extending from opposing ends of a coupling midsection 145B. The assembly 100B uses two compression nuts 130, which are sized to fit about the coupling first and second segments 140B, 150B. Referring also to FIGS. 9A, 9B, and 9C, to secure a first conduit 10B to a second conduit 20B, the conduit 10B can be inserted into the coupling first segment 140B and the compression nut 130 rotated, compressing the first gland ring 120 about the conduit 10B and securing the conduit 10B to the coupling assembly 100B. The second conduit 20B can similarly be inserted into the coupling second segment 150B and the second compression nut 130 rotated, compressing the second gland ring 120 about the conduit 20B and securing the conduit 20B to the coupling assembly 100B. The two conduits 10B, 20B can be secured together by rotating the compression nuts 130 rather than the conduits 10B, 20B. Moreover, assembly 100B is well suited to securing conduits such as conduit 10B, which is threaded at its end, as well as conduits such as conduit 20B, which is unthreaded at its end. Advantageously, the compressible gland ring 120 can grip either threaded conduits or non-threaded conduits. Conduits often come in 10 feet lengths with threaded ends. A user (such as an electrician) often will have to cut the last conduit to a specific length to complete a run. Traditionally, the user would add threads on the cut end of the conduit using a messy, bulky thread cutter. Teeth/serrations 210 on the gland ring 120 (further discussed below) help grip non-threaded ends of conduits, making it unnecessary for a user to cut new threads on an unthreaded end of a conduit.

Further advantages and features of the invention will be apparent from the remainder of this document in conjunction with the associated drawings.

BRIEF DESCRIPTION OF THE DRAWINGS

FIG. 2 is a table with sample specifications for commonly-used conduit sizes for conduits 10, 20.

FIG. 5A shows the coupling assembly 100 of FIGS. 3A and 3B between two conduits 10, 20. FIG. 5B shows the coupling assembly 100 of FIG. 5A being secured to a first conduit 10 by engaging internal threading of the coupling body 110 about external threading of the first conduit 10. FIG. 5C shows the coupling assembly 100 of FIGS. 5A and 5B being secured to a second conduit 20 by engaging internal threading of the compression nut 130 about external threading of the second conduit 20.

FIG. 6A shows an alternative compression nut 132 that is hexagonal, and FIG. 6B shows an alternative compression nut 134 that is "ribbed," "knubbed," or "bumped."

FIG. 8 is a cross-sectional view of the coupling assembly 100B of FIG. 7 securing two conduits 10B, 20B together end-to-end.

FIG. 10 is an exploded view of an exemplary coupling/connector assembly 100C having a coupling/connector body 110C for securing a conduit 10B or 20B to a junction box (not pictured) using a locknut 270.

FIG. 11A is a cross-sectional view of the coupling/connector assembly 100C of FIG. 10 securing conduit 10B having an end 250B that is externally threaded. FIG. 11B is a cross-sectional view of the coupling/connector assembly 100C of FIG. 10 securing conduit 20B having an end 260B that is not externally threaded.

FIG. 12A is an exploded view of the exemplary coupling assembly 100 of FIG. 3A, with a seal 300 for making the coupling assembly 100 more suitable for wet applications. FIG. 12B is a cross-sectional view of the coupling assembly 100 of FIG. 12A with the seal 300.

DETAILED DESCRIPTION OF PREFERRED VERSIONS OF THE INVENTION

Figure 1A:
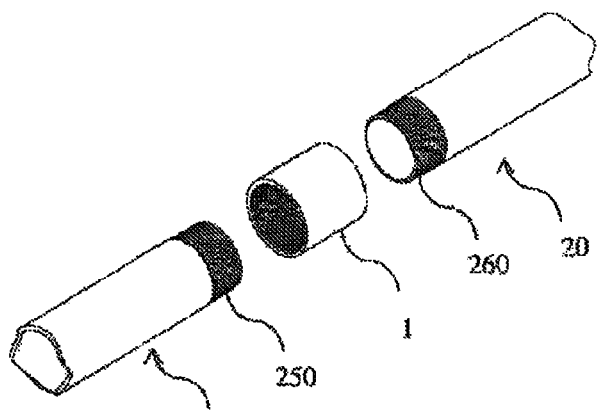
FIG. 1A shows a prior art coupling 1 that fits with the two conduits 10, 20.
Figure 1B:
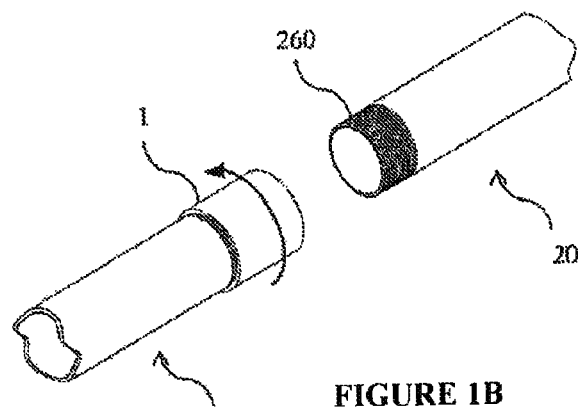
FIG. 1B shows the coupling 1 being screwed into a first conduit 10.
Figure 1C:
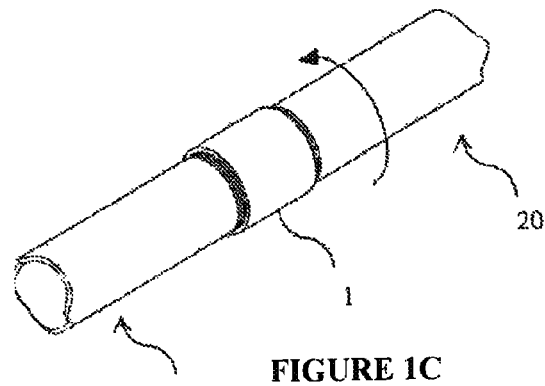
FIG. 1C shows a second conduit 20 being screwed into the coupling 1 to secure the two conduits 10, 20 together end-to-end.
Figure 3:
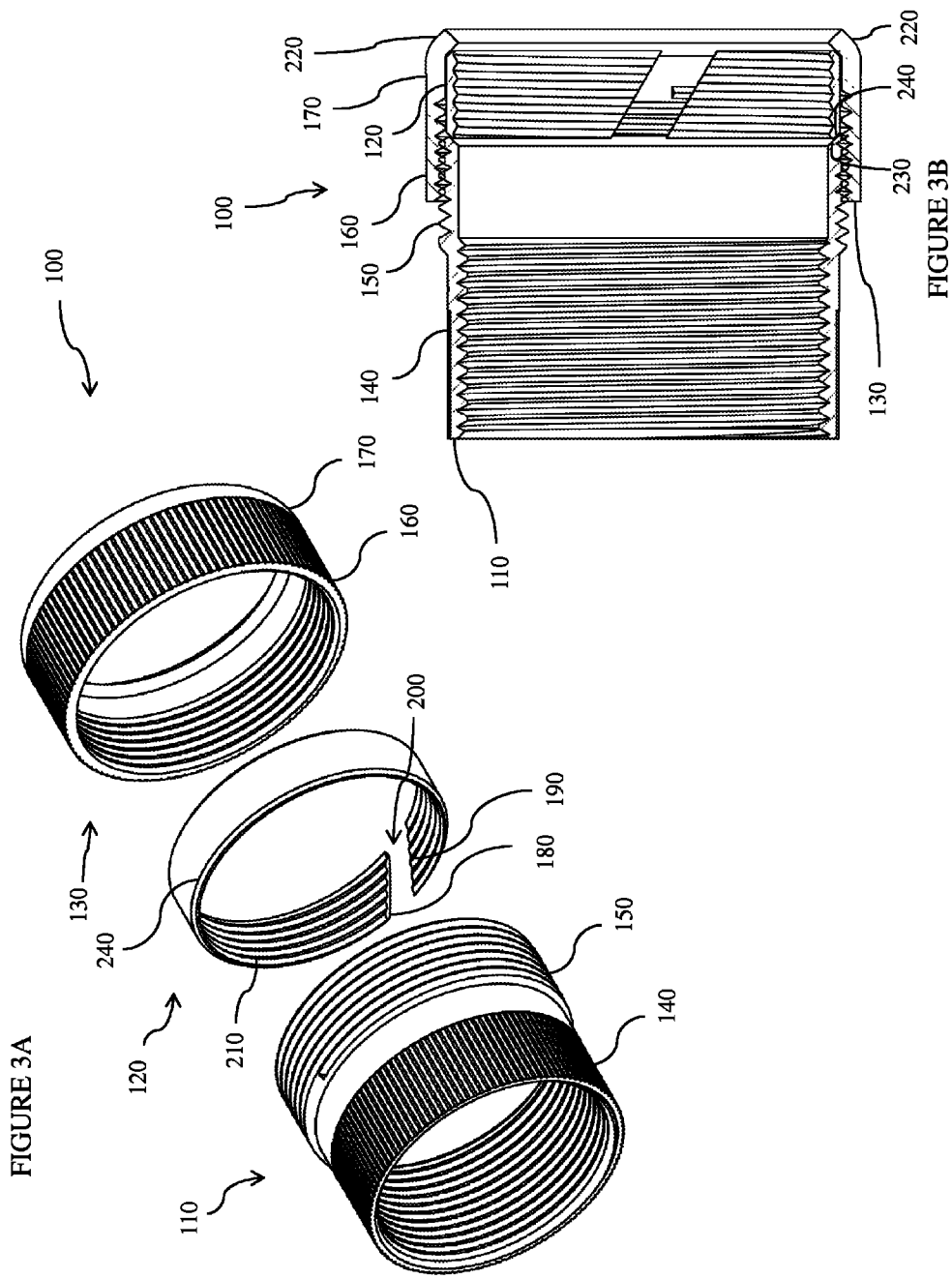
FIG. 3A is an exploded view of an exemplary coupling assembly 100 with a coupling body 110, a gland ring 120, and a compression nut 130.
FIG. 3B is a cross-sectional view of the coupling assembly 100 of FIG. 3A.
Figure 7:
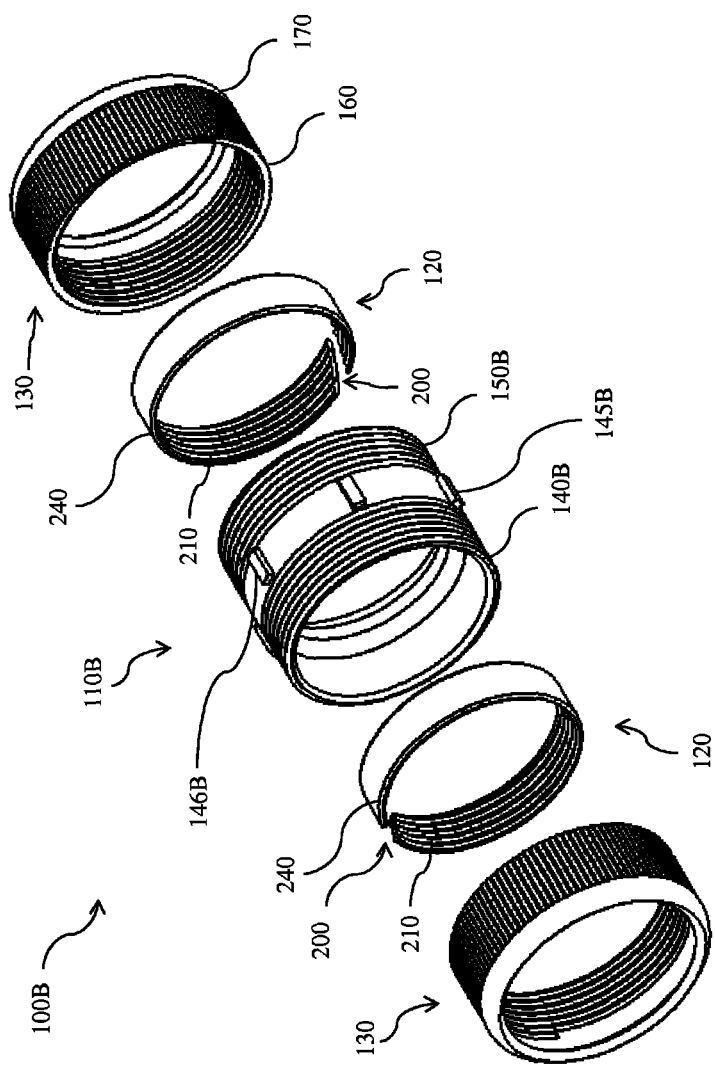
FIG. 7 is an exploded view of an alternative exemplary coupling assembly 100B having a coupling body 110B with two gland rings 120 and two compression nuts 130.
Figure 9B:
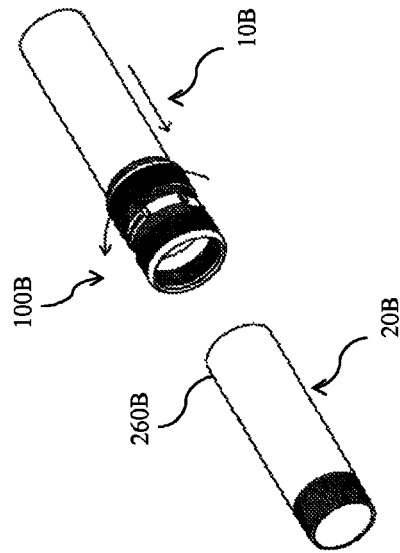
FIG. 9B shows the coupling assembly 100B of FIG. 9A being secured to a first conduit 10B by sliding an end of the conduit 10B into the coupling body 110B and tightening a first compression nut 130.
Figure 9A:
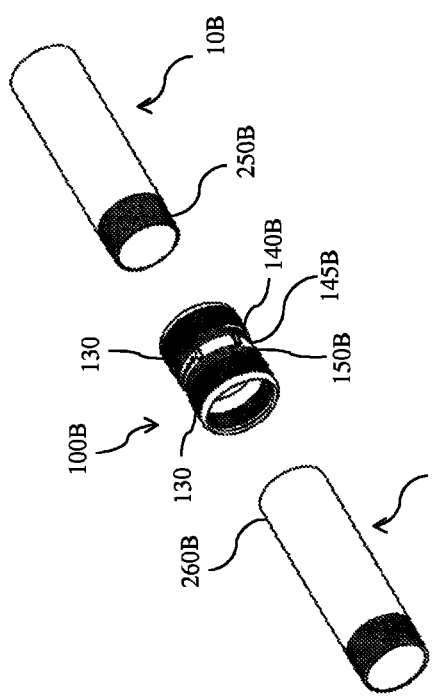
FIG. 9A shows the coupling assembly 100B of FIGS. 7 and 8 between two conduits 10B, 20B.
Figure 9C:
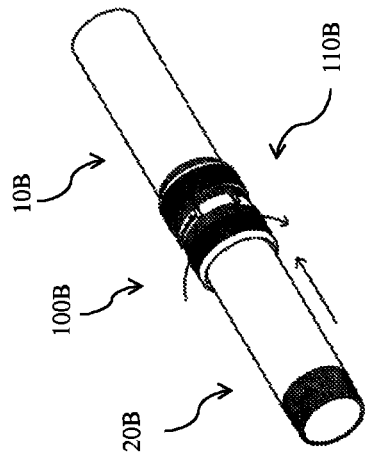
FIG. 9C shows the coupling assembly 100B of FIGS. 9A and 9B being secured to a second conduit 20B by sliding an end of the conduit 20B into the coupling body 110B and tightening a second compression nut 130.

Referring to FIGS. 3A, 7, and 10, assemblies 100, 100B, 100C include the compressible gland ring 120 extending from a first circumferential end 180 to a second circumferential end 190. The gland ring 120 is biased such that, when the ring is not being compressed (as shown in FIGS. 3A, 7, and 10), there is a gap 200 between the first circumferential end 180 and the second circumferential end 190. The first circumferential end 180 approaches the second circumferential end 190 when the gland ring 120 is compressed. The first and second circumferential ends 180, 190 may be complementarily interfittable such that when the ends meet to close the gap 200, the gland ring 120 is essentially cylindrical. The gland ring 120 is preferably internally threaded, with a set of teeth/serrations 210 or protrusions extending in an inwardly direction. The internal thread 210 of gland ring 120 preferably has the same pitch as the external thread of (for example) conduits 10, 10B, 20 to allow the threads to interlock.

The coupling body 110 includes an internally-threaded coupling first segment 140 extending from an externally-threaded coupling second segment 150, and the compression nut 130 includes an internally-threaded nut first segment 160 extending from a nut second segment 170 (which is without threading in the version shown in the drawings). As can be seen in FIG. 3B, the nut first segment 160 is sized to fit about the coupling second segment 150 and threadably engage the coupling second segment 150, such as by having the coupling second segment 150 "screwed into" the nut first segment 160. Referring to FIGS. 7 and 8, the coupling body 110B includes a first segment 140B and a second segment 150B extending from opposing sides of a midsection 145B. The first and second segments 140B, 150B are externally-threaded but are not internally-threaded in the version shown in the drawings. The midsection 145B has flanges 146B (which can be any surface features that increase friction, such as ridges, bumps, or knobs) to enhance grip when the midsection 145B is grasped by a user. As can be seen in FIG. 8, the nut first segment 160 is sized to fit about the coupling first and second segments 140B, 150B and to threadably engage the coupling first and second segments 140B, 150B, such as by having the coupling first and second segments 140B, 150B "screwed into" the nut first segments 160 of the first and second compression nuts 130. Referring to FIGS. 10, 11A, and 11B, the connector body 110C includes a first segment 140C and a second segment 150C extending from opposing sides of a midsection 145C. The first and second segments 140C, 150C are externally-threaded but are not internally-threaded in the version shown in the drawings. The midsection 145C has flanges 146C (which can be any surface features that increase friction, such as ridges, bumps, or knobs) to enhance grip when the midsection 145C is grasped by a user. As can be seen in FIGS. 11A and 11B, the nut first segment 160 is sized to fit about the second segment 150C and to threadably engage the second segment 150C, such as by having the second segment 150C "screwed into" the nut first segment 160 of the compression nut 130.

Figure 4:
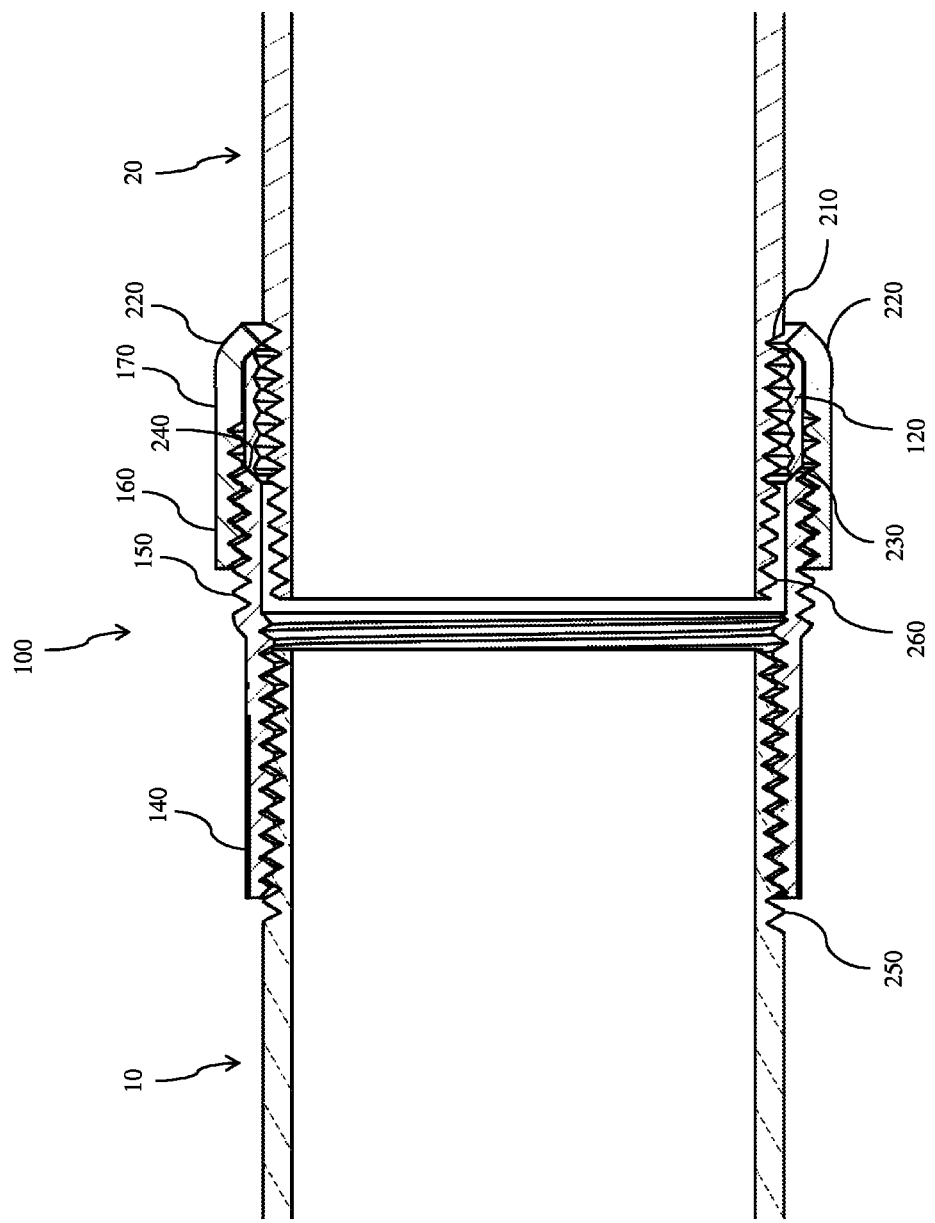
FIG. 4 is a cross-sectional view of the coupling assembly 100 of FIGS. 3A and 3B securing two conduits 10, 20 together end-to-end.

Referring to FIGS. 3B and 4, the nut second segment 170 includes a bend 220 that extends inwardly at a terminus of the compression nut 130. When the gland ring 120 engages a conduit, the bend 220 restricts the movement of the gland ring 120. The gland ring 120 is pressed by the coupling body 110, the compression nut 130, and the second conduit 20. Rotating the compression nut 130 presses the gland ring 120 against the coupling second segment 150, and compresses the gland ring 120 (shrinking the gap 200). The coupling body 110 may include a coupling chamfer 230 at the terminus of the coupling second segment 150—that is, the coupling second segment 150 may be angled inwardly at its end. The gland ring 120 may similarly include a ring chamfer 240 at one or both axial ends, with the ring chamfer 240 being complementary to the coupling chamfer 230. As the compression nut 130 is threadably engaged with the coupling second segment 150, and as the compression nut 130 moves closer to the coupling first segment 140, the gland ring 120 will be squeezed between the bend 220 and the coupling second segment 150. As the gland ring 120 is squeezed, the ring chamfer 240 will tend to slide against the coupling chamfer 230, compressing the gland ring 120. As the gland ring 120 is compressed, the first circumferential end 180 of the gland ring 120 will approach the second circumferential end 190 of the gland ring 120, and the gland ring 120 will tend to "bite" down on the second conduit 20.

Referring to FIGS. 4, 5A, 5B, and 5C, the first conduit 10 may include a first conduit end 250 that is externally threaded, and the second conduit 20 may include a second conduit end 260 that is externally threaded. To secure the first conduit 10 together with the second conduit 20 using the coupling assembly 100, a user may start by positioning the gland ring 120 in the nut second segment 170 (if the gland ring 120 is not already situated therein). The user may then threadably engage the coupling second segment 150 with the nut first segment 160 by screwing the compression nut 130 onto the coupling body 110 to obtain the coupling assembly 100 shown in FIG. 5A. The coupling first segment 140 may then be threadably engaged with the externally-threaded first conduit end 250 by screwing the coupling assembly 100 onto the first conduit 10; this would involve rotating the coupling assembly 100 clockwise from the perspective shown in FIG. 5B. Then, the second conduit 20 may be inserted into the coupling assembly 100 by sliding the second conduit end 260 at least partly into the nut second segment 170 and the coupling second segment 150. The coupling assembly 100 may then be tightened about the second conduit end 260 by rotating the compression nut 130 (also clockwise from the perspective shown in FIG. 5C). This rotation will tend to squeeze the gland ring 120 between the bend 220 and the coupling second segment 150, slide the ring chamfer 240 of the gland ring 120 against the coupling chamfer 230 of the coupling second segment 150, and compress the gland ring 120 (bringing the first circumferential end 180 closer towards, or abutting against, the second circumferential end 190) so that the gland ring 120 grips or bites into the second conduit 20 and secures it in place. The internal threading or inwardly-extending teeth 210 of the gland ring 120 help the gland ring 120 (and the coupling assembly 100) better engage the second conduit 20. The user need not rotate the cumbersome rigid conduits 10, 20 to secure them together.

Referring to FIGS. 7 and 8, when the conduits 10B, 20B are secured to each other, the gland rings 120 are squeezed by the coupling body 110B, the compression nuts 130, and the conduits 10B, 20B. The coupling body 110B may include coupling chamfers 230B at the termini of the coupling first and second segments 140B, 150B, the coupling chamfers 230B preferably being complementary to the ring chamfers 240. As the compression nuts 130 are threadably engaged with the coupling first and second segments 140B, 150B, and as the compression nuts 130 move closer to the coupling first and second segments 140B, 150B, the gland rings 120 are squeezed between the bends 220 and the coupling first and second segments 140B, 150B. As the gland rings 120 are squeezed, the ring chamfers 240 will tend to slide against the coupling chamfers 230B, compressing the gland rings 120. As each gland ring 120 is compressed, the first circumferential end 180 of the gland ring 120 will approach the second circumferential end 190 of the gland ring 120, and the gland ring 120 will bite down on the conduits 10B, 20B using teeth 210. This "biting down" or gripping of conduits 10B, 20B by the gland rings 120 works well with both threaded ends (as in 250B) and unthreaded ends (as in 260B).

In similar fashion, the connector body 110C can be secured to conduit 10B (which is externally threaded at the end 250B that is inserted into second segment 150C) by using the gland ring 120 to interlock threads with the external threads at end 250B of the conduit 10B (see FIGS. 10 and 11A). The connector body 110C can also be secured to conduit 20B (which is not threaded at the end 260B that is inserted into second segment 150C) by using the gland ring 120 to bite down on or clamp the outer surface of the conduit 20B (see FIGS. 10 and 11B). As the gland ring 120 is squeezed, the ring chamfer 240 will tend to press against the coupling chamfer 230C, compressing the gland ring 120. Generally, greater compression results in a stronger bite/clamp on a conduit. The gland ring 120 is squeezed between the bend 220 and the second segment 150C.

Referring to FIGS. 8, 9A, 9B, and 9C, the first conduit 10B may include a first conduit end 250B that is externally threaded, and the second conduit 20B may include a second conduit end 260B that is not externally threaded. To secure the first conduit 10B together with the second conduit 20B using the coupling assembly 100B, the user may threadably engage the coupling first and second segments 140B, 150B with the nut first segments 160 by screwing the compression nuts 130 onto the coupling body 110B to obtain the coupling assembly 100B shown in FIG. 9A. The user then inserts the end of conduit 10B into the first segment 140B and rotates the first compression nut 130 to threadably engage the internal threading of the compression nut 130 with the external threading of the first segment 140B. The first gland ring 120 is compressed and the teeth 210 (internal threading) of the gland ring 120 are received in the external threading of the first segment 140B. With the first gland ring 120 biting the end of conduit 10B (and threads 210 interlocking with the external threads at conduit end 250B), conduit 10B is secured to the assembly 100B. Similarly, the user inserts the end of conduit 20B into second segment 150B and rotates the second compression nut 130 to threadably engage the internal threading of the compression nut 130 with the external threading of the the second segment 150B. The second gland ring 120 is compressed and the teeth 210 (internal threading) of the gland ring 120 bite into conduit 20B to secure conduit 20B to the assembly 100B.

The connector body 110C may be assembled into connector assembly 100C in a similar fashion as discussed above with respect to the coupling body 110B. Once the conduit 10B or 20B has been inserted into the second segment 150C and secured by tightening of the compression nut 130, the first segment 140C can be inserted into an opening in a junction body, and secured to the junction box using a locknut 270. This allows the user to use the connector body 110C in securing a conduit 10B or 20B to a junction box, with the conduit 10B, 20B providing passage into and out of the junction box (not pictured).

In the coupling assembly 100 of FIG. 3A, the coupling first segment 140 has a first diameter, the coupling second segment 150 has a second diameter that is greater than the first diameter, and the compression nut 130 has a third diameter that is greater than the second diameter. The coupling first segment 140 and the compression nut 130 can be externally ridged for better grip as the user rotates the coupling body 110 and the compression nut 130. Alternatively, the compression nut 130 may be hexagonal 132 (see FIG. 6A) or "ribbed"/"knubbed"/"bumped" 134 (see FIG. 6B) to enhance the ability of a user to grip and rotate the compression nut 130.

In the coupling assembly 100B shown of FIG. 7, the coupling first segment 140B has a first diameter, the coupling second segment 150B has a second diameter that is substantially the same as the first diameter, and the compression nut 130 has a third diameter that is greater than the first and second diameters of first and second segments 140B, 150B, respectively. The midsection 145B has a fourth diameter that may be less than, substantially the same as, or greater than the first and second diameters of first and second segments 140B, 150B, respectively. In the connector assembly 100C of FIG. 10, the connector first segment 140C has a first diameter, the connector second segment 150C has a second diameter that is greater than the second diameter, and the compression nut 130 has a third diameter that is greater than the second diameter of the second segment 150C. The midsection 145C has a fourth diameter that may be less than, substantially the same as, or greater than the first and second diameters of first and second segments 140C, 150C. The diameter of the first segment 140C is preferably selected so as to complementarily fit into an aperture of a junction box.

Figure 13:
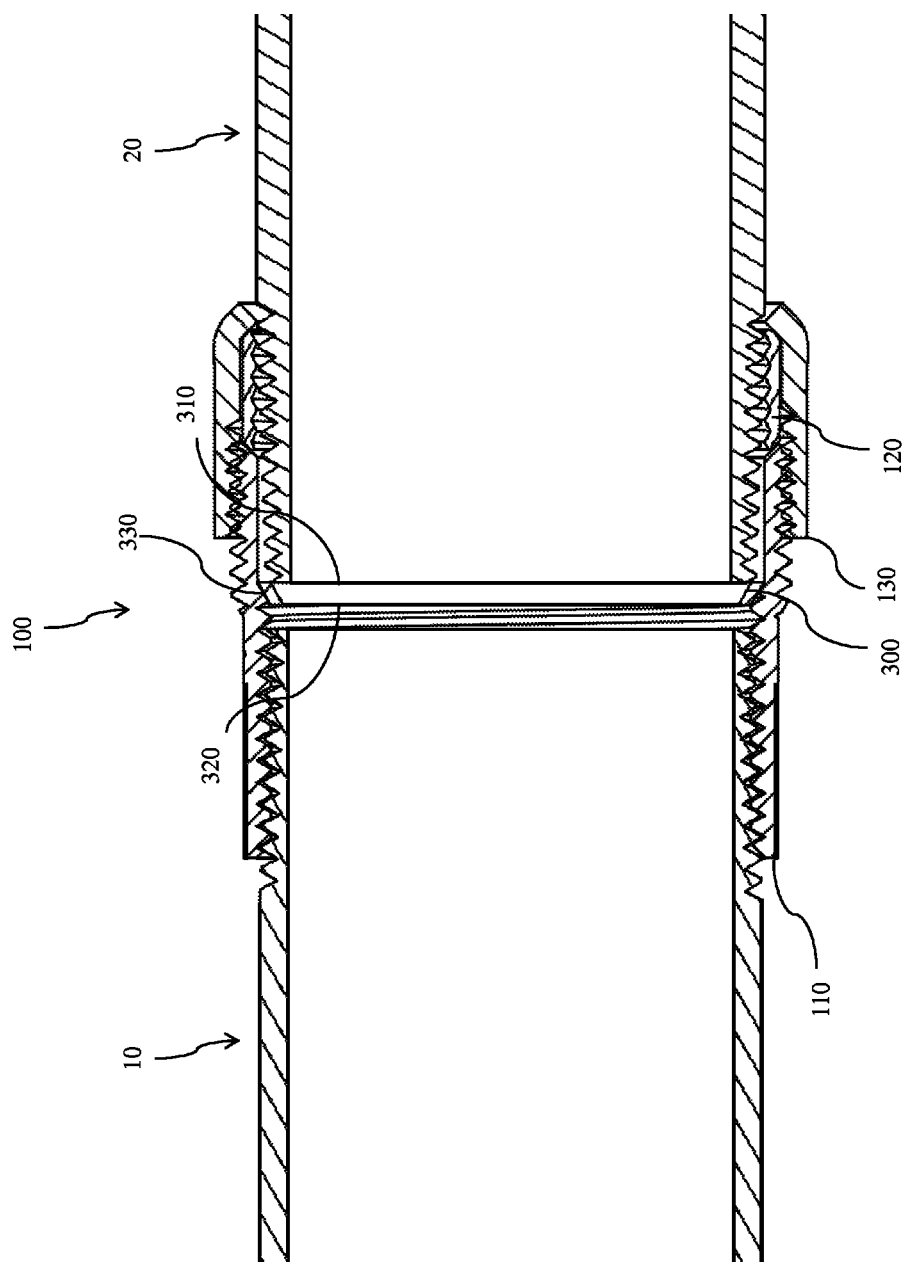
FIG. 13 is a cross-sectional view of the coupling assembly 100 of FIGS. 12A and 12B with two conduits 10, 20 secured end-to-end, and with the seal 300 for helping keep moisture out.
Figure 14:
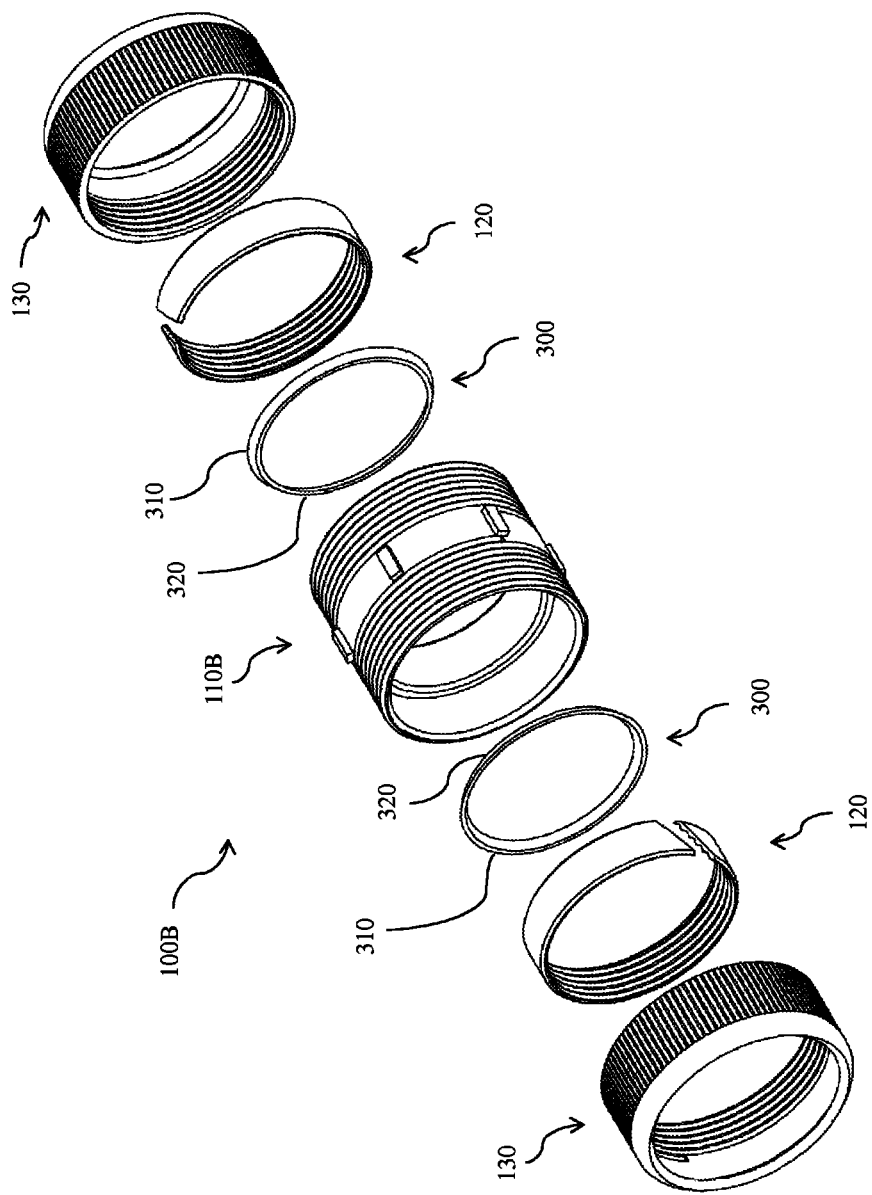
FIG. 14 is an exploded view of the alternative exemplary coupling assembly 100B of FIG. 7 with a pair of seals 300.
Figure 15:
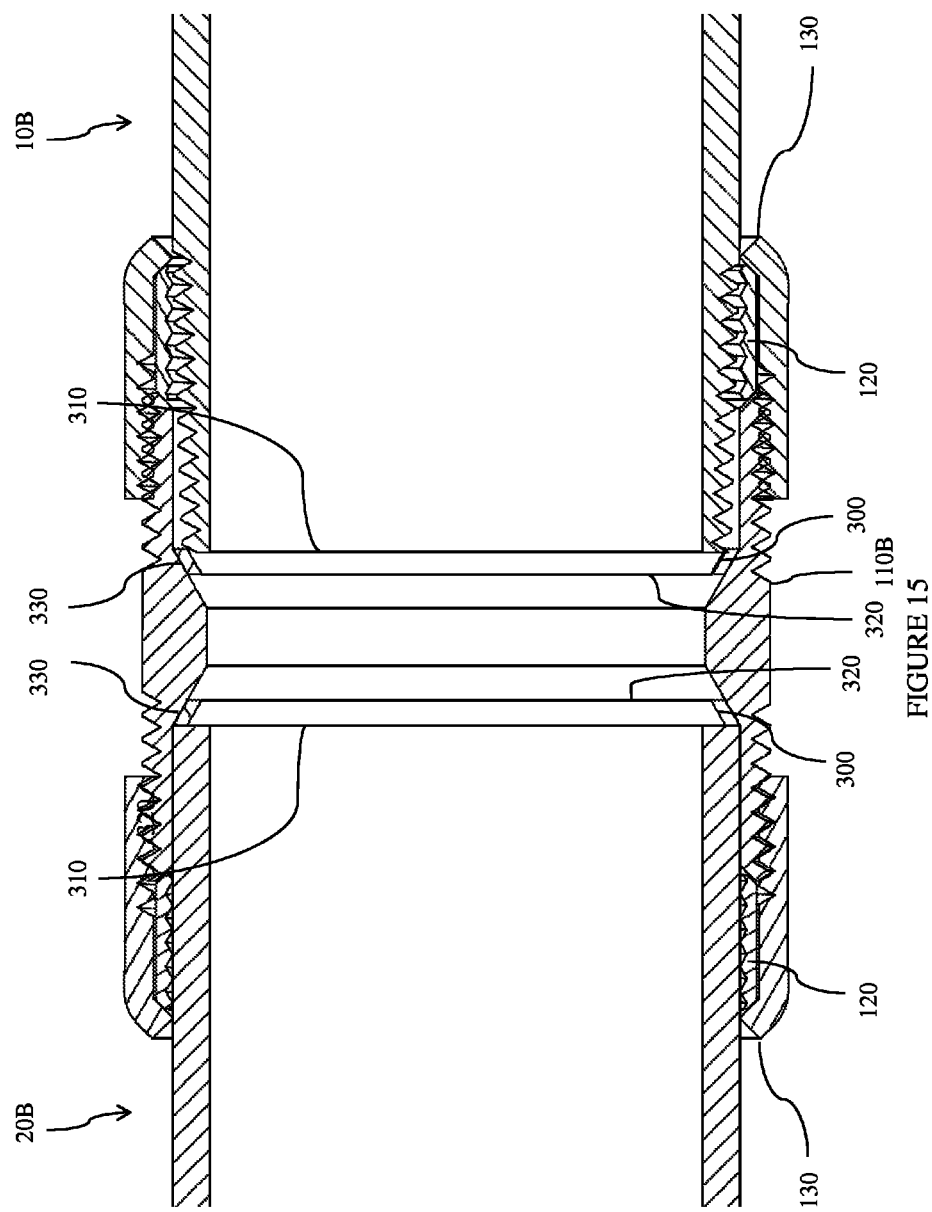
FIG. 15 is a cross-sectional view of the coupling assembly 100B of FIG. 14 securing two conduits 10B, 20B together end-to-end, with seals 300 jammed between the conduits 10B, 20B and chamfers 330 of the internal diameter or "throat" of the coupling body 110B.
Figure 16:
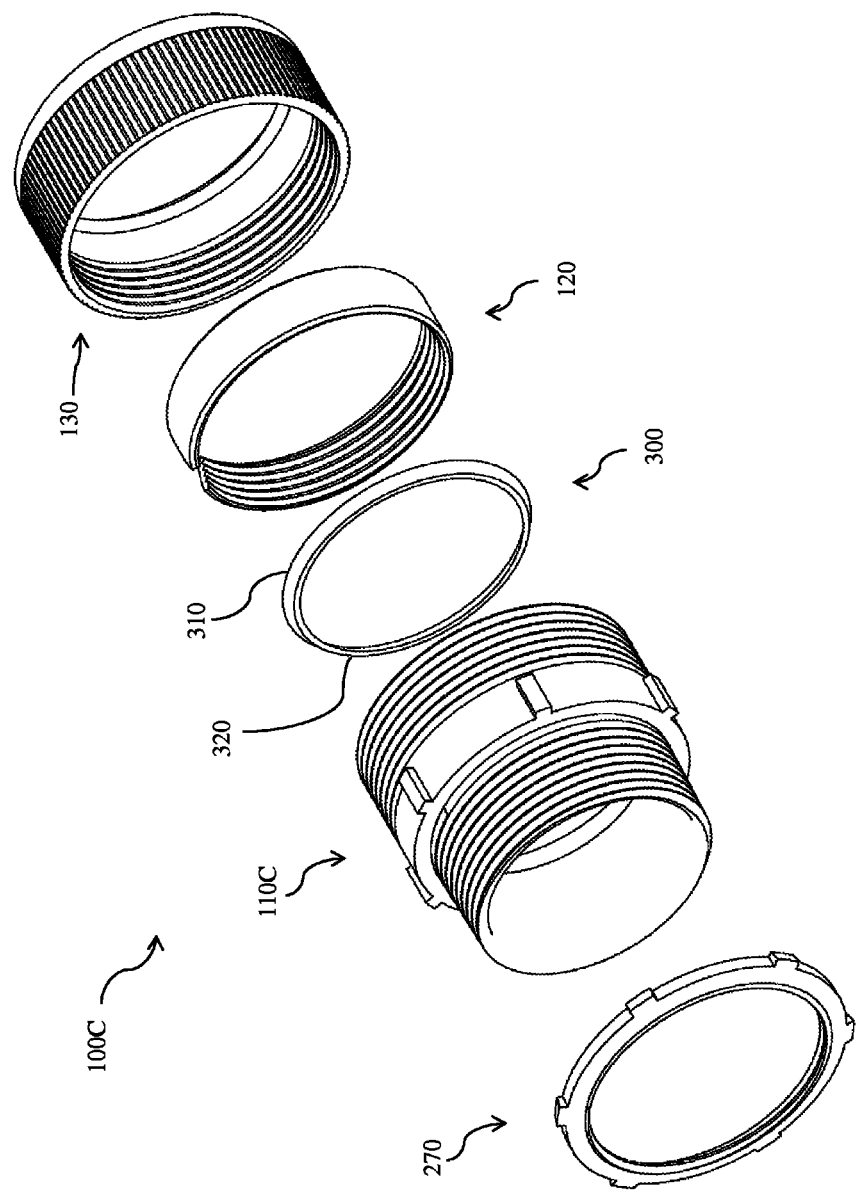
FIG. 16 is an exploded view of the exemplary coupling/connector assembly 100C of FIG. 10 with a seal 300 for making the coupling assembly 100C more suitable for wet applications.
Figure 17A:
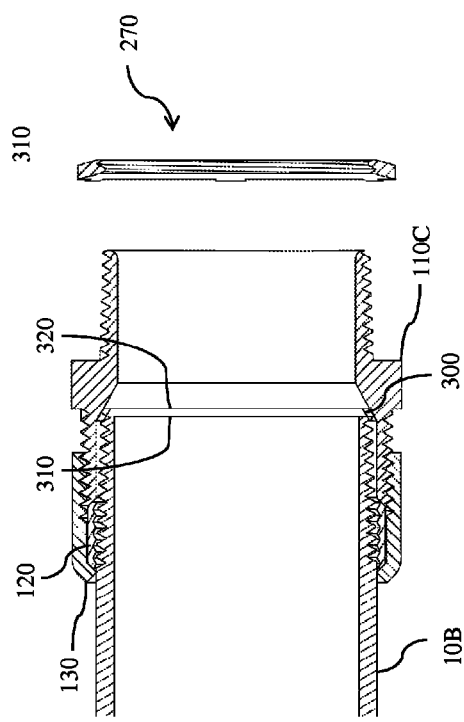
FIG. 17A is a cross-sectional view of the coupling/connector assembly 100C of FIG. 16 securing conduit 10B having an end 250B that is externally threaded, with seal 300 for helping keep moisture out of conduit 10B.
Figure 17B:
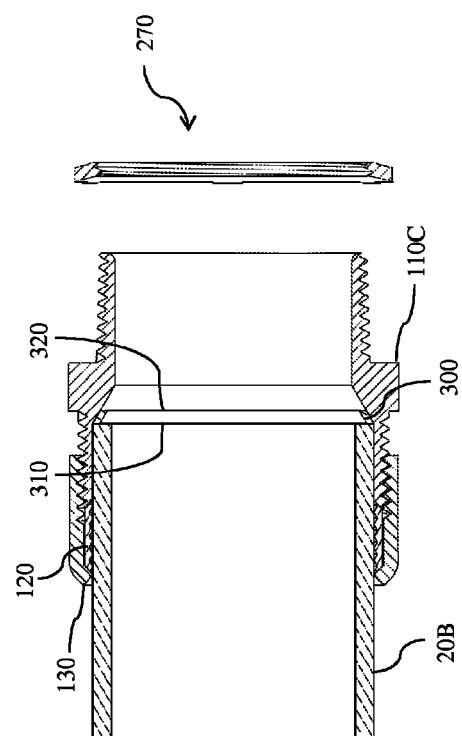
FIG. 17B is a cross-sectional view of the coupling/connector assembly 100C of FIG. 16 securing conduit 20B having an end 260B that is not externally threaded, with seal 300 for helping keep moisture out of conduit 20B.

Referring to FIGS. 12A, 12B, and 13, the assembly 100 of FIGS. 3A, 3B, and 4 may further include a seal 300 made of (for example) rubber or nylon. Similarly, FIGS. 14 and 15 show the assembly 100B of FIGS. 7 and 8 but with a pair of seals 300 included therein. And FIGS. 16, 17A, and 17B show the assembly 100C of FIGS. 10, 11A, and 11B but with a seal 300 included therein. In the version shown in the drawings, the seal 300 extends axially from a seal first end 310 to a seal second end 320. The seal first end 310 has a seal first diameter, and the seal second end has a seal second diameter. The seal first diameter is greater than the seal second diameter, with the diameter of the seal 300 decreasing gradually and at a substantially constant rate from the seal first end 310 to the seal second end 320. This gives the seal 300 the appearance of a conical frustum, with the seal first end 310 situated at the base of a cone, and the seal second end 320 being situated at a parallel plane slicing the cone at a height "above" the base.

The seal 300 allows the assembly to be better suited to wet applications by significantly reducing or even eliminating the penetration of moisture (and other contaminants) into the assembly 100, 100B, 100C. That is, the seal 300 enhances the ability of the assembly 100, 100B, 100C to be used in environments or locations where the likelihood of getting water in conduits is higher. The seal 300 helps keep moisture out of the conduits 10, 10B, 20, 20B. When the seal 300 is included in an assembly 100, 100B, 100C that is securing conduits together, the seal 300 is jammed inside the coupling or connector body 110, 110B, 110C between the conduit 10, 10B, 20, 20B and a chamfer 330 of the internal diameter or "throat" of the coupling or connector body 110, 110B, 110C. The seal 300 has a shape that is complementary to the chamfer 330, such that when the seal 300 abuts the chamfer 330, there is no substantial gap between the seal 300 and the coupling or connector body 110, 110B, 110C large enough to allow fluid to enter the conduit.

It must be kept in mind that the assemblies 100, 100B, and 100C shown in the accompanying drawings and discussed above are merely exemplary, and may assume a wide variety of configurations and relative sizes different from those noted, and may use components different from those noted. It also should be understood that various terms referring to orientation and position used throughout this document are relative terms rather than absolute ones. Also, it is to be understood that such terms as "forward," "rearward," "left," "right," "upwardly," "downwardly," and the like are words of convenience and are not to be construed as limiting terms.

Various preferred versions of the invention are shown and described above to illustrate different possible features of the invention and the varying ways in which these features may be combined. Apart from combining the different features of the foregoing versions in varying ways, other modifications are also considered to be within the scope of the invention. The invention is not intended to be limited to the preferred versions of the invention described above, but rather is intended to be limited only by the claims set out below. Thus, the invention encompasses all different versions that fall literally or equivalently within the scope of these claims.

What is claimed is:

1. An assembly,
   comprising:
   i. a coupling body having an externally-threaded coupling first segment and an externally-threaded coupling second segment, the coupling first and second segments situated on opposing sides of a coupling midsection;
   ii. a first compression nut and a second compression nut, wherein:
      1) each of the first and second compression nuts has an internally-threaded nut first segment extending from a nut second segment,
      2) the nut first segment of the first compression nut is dimensioned to complementarily fit about the coupling first segment, and the nut first segment of the second compression nut is dimensioned to complementarity fit about the coupling second segment;
   iii. a first compressible gland ring and a second compressible gland ring,
      wherein:
      1) each of the first and second gland rings extends from a first circumferential end to a second circumferential end,
      2) each gland ring is biased such that there is a gap between the first circumferential end and the second circumferential end when the ring is not being compressed,
      3) the first gland ring is dimensioned to fit within the first compression nut, and the second gland ring is dimensioned to fit within the second compression nut;
   wherein a first conduit is securable to a second conduit end-to-end by:

i. threadably engaging the nut first segment of the first compression nut about the coupling first segment, and threadably engaging the nut first segment of the second compression nut about the coupling second segment;

ii. with the first gland ring situated in the first compression nut, inserting a first conduit end of a first conduit into the coupling first segment and rotating the first compression nut about the first conduit to engage the first gland ring about the first conduit end; and iii. with the second gland ring situated in the second compression nut, inserting a second conduit end of a second conduit into the coupling second segment and rotating the second compression nut about the second conduit to engage the second gland ring about the second conduit end; and wherein the first conduit has a first conduit end that is externally threaded, and the second conduit has a second conduit end that is externally non-threaded, and wherein:

i. the first and second gland rings are internally threaded;

ii. the internal threading of the first gland rings interlocks with the external threading of the first conduit end; and iii. the internal threading of the second gland ring bites an outer surface of the second conduit end.

2. The assembly of claim 1 wherein the first and second conduits are secured together end-to-end without rotation of either the first or second conduits.

3. The assembly of claim 1 wherein the first and second gland rings press against the first and second conduits, respectively, such that the first and second conduits are securable together end-to-end.

4. The assembly of claim 1 wherein:
a. the first compression nut is rotated about the first conduit in a first direction to secure the first conduit; and
b. the second compression nut is rotated about the first conduit in a second direction to secure the second conduit, the second direction opposing the first direction.

5. The assembly of claim 1, wherein for each of the first and second gland rings, the first circumferential end is complementarily-interfittable with the second circumferential end.

6. The assembly of claim 1 wherein the first and second compression nuts compress the first and second gland rings, respectively, as the first and second compression nuts are rotated about the coupling first and second segments, respectively.

7. The assembly of claim 1 wherein:
a. each of the coupling first and second segment includes a coupling chamfer; and
b. rotating the first and second compression nuts:
   i. presses the first and second gland rings against the chamfers of the first and second coupling segments, respectively, and
   ii. compresses the gland ring.

8. The assembly of claim 1 wherein:
a. the coupling first and second segments terminate in a coupling chamfer; and
b. each of the first and second gland rings includes a ring chamfer that is complementary to the coupling chamfer of the coupling first and second segments, respectively.

9. The assembly of claim 1 wherein:
a. each of the first and second gland rings includes at least one protrusion extending in an inwardly direction; and
b. when the first conduit is secured with the second conduit, the protrusions of the first and second gland rings engage the first and second conduits, respectively, to restrict the movement of the first and second conduits out of the coupling first and second segments, respectively.

10. The assembly of claim 1 further including a seal, the seal extending from a first axial end having a first diameter to a second axial end having a second diameter, the first diameter being greater than the second diameter, wherein:
a. the coupling body is internally dimensioned so as to complementarily abut the seal;
b. when the first or second conduit is secured with the seal squeezed between the coupling body and the first or second conduit so as to reduce the moisture entering the first or second conduit, the first axial end touches the first or second conduit and the second axial end touches the coupling body.

11. The assembly of claim 1 wherein each of the first and second compression nuts includes a bend that extends inwardly at the nut second segment.

12. The assembly of claim 11 wherein as the first and second compression nuts are rotated about the coupling first and second segments to threadably engage the first and second gland rings with the first and second conduits, respectively, the bends of the first and second compression nuts move closer to the coupling midsection.

13. The assembly of claim 11 wherein:
a. when the first gland ring is compressed about the first conduit, the bend of the first compression nut limits axial displacement of the first gland ring; and
b. when the second gland ring is compressed about the second conduit, the bend of the second compression nut limits axial displacement of the second gland ring.

14. The assembly of claim 11 wherein:
a. the coupling first and second segments terminate in a coupling chamfer;
b. each of the first and second gland rings includes a ring chamfer at an axial end thereof;
c. when the first and second compression nuts are rotated about the coupling first and second segments such that the first and second compression nuts, respectively, move closer to the coupling midsection, the first and second gland rings will be:
   i. squeezed between the bends of the first and second compression nuts and the coupling first and second segments, respectively; and
   ii. compressed as the ring chamfers slide against the coupling chamfers.

15. A method of securing two conduits together end-to-end, the method comprising:
i. providing a coupling body having an externally-threaded coupling first segment and an externally-threaded coupling second segment, the coupling first and second segments situated on opposing sides of a coupling midsection;
ii. providing a first compression nut and a second compression nut, wherein:
   1) each of the first and second compression nuts has an internally-threaded nut first segment extending from a nut second segment,
   2) the nut first segment of the first compression nut is dimensioned to complementarily fit about the coupling first segment, and the nut first segment of the second compression nut is dimensioned to complementarily fit about the coupling second segment;
iii. providing a first compressible gland ring and a second compressible gland ring, wherein:
1) each of the first and second gland rings extends from a first circumferential end to a second circumferential end,
2) each gland ring is biased such that there is a gap between the first circumferential end and the second circumferential end when the ring is not being compressed,
3) the first gland ring is dimensioned to fit within the first compression nut, and the second gland ring is dimensioned to fit within the second compression nut;
iv. threadably engaging the nut first segment of the first compression nut about the coupling first segment, and threadably engaging the nut first segment of the second compression nut about the coupling second segment;
v. with the first gland ring situated in the first compression nut, inserting a first conduit end of a first conduit into the coupling first segment and rotating the first compression nut about the first conduit to engage the first gland ring about the first conduit end;
vi. with the second glam ring situated in the second compression nut, inserting a second conduit end of a second conduit into the coupling second segment and rotating the second compression nut about the second conduit to engage the second gland ring about the second conduit end, wherein the first conduit has a first conduit end that is externally threaded, and the second conduit has a second conduit end that is externally non-threaded, and wherein:
1) the first and second gland rings are internally threaded;
2) the internal threading of the first gland rings interlocks with the external threading of the first conduit end; and
3) the internal threading of the second gland ring bites an outer surface of the second conduit end.

16. The method of claim 15 wherein the first and second conduits are secured together end-to-end by rotating the first and second compression nuts without rotating the first or second conduits.

17. The method of claim 15, further comprising:
providing a seal that is substantially formed as a conical frustum
wherein the coupling body internally dimensioned so as to complementarily abut the seal; and
placing the seal inside the coupling body such that the first or second conduit is secured with the seal squeezed between the coupling body and the conduit.

18. A coupling assembly,
a. comprising:
i. a coupling body having an externally-threaded coupling first segment and an externally-threaded coupling second segment, the coupling first and second segments extending in opposing directions from a coupling midsection;
ii. a compression nut having an internally-threaded nut first segment extending from a nut second segment, the nut first segment being threadably engageable about the coupling first segment; and
iii. a compressible gland ring extending from a first circumferential end to a second circumferential end, the gland ring being internally threaded;
b. wherein a first conduit is secured to the coupling body by:
i. inserting a first conduit end of the first conduit into the coupling first segment; and
ii. threadably engaging the nut first segment about the coupling first segment;
c. further including:
i. a second compression nut having an internally-threaded nut first segment extending from a nut second segment, the nut first segment being threadably engageable about the coupling second segment;
ii. a second compressible gland ring extending from a first circumferential end to a second circumferential end, the second gland ring being internally threaded;
d. wherein:
i. a second conduit is secured to the coupling body such that the second conduit is secured end-to-end with the first conduit by:
1) inserting a second conduit end of the second conduit into the coupling second segment; and
2) threadably engaging the nut first segment of the second compression nut about the coupling second segment; and
ii. a first conduit is securable end-to-end with a second conduit by rotation of the first and second compression nuts without rotation of the first and second conduits; and
e. wherein:
the first conduit end of the first conduit is externally threaded, and the second conduit end of the second conduit is externally non-threaded, and wherein the internal threading of the first gland rings interlocks with the external threading of the first conduit end, and the internal threading of the second gland ring bites an outer surface of the second conduit end.

* * * * *